United States Patent
Shanley et al.

(10) Patent No.: US 6,765,867 B2
(45) Date of Patent: Jul. 20, 2004

(54) METHOD AND APPARATUS FOR AVOIDING HEAD OF LINE BLOCKING IN AN ATM (ASYNCHRONOUS TRANSFER MODE) DEVICE

(75) Inventors: Timothy M. Shanley, Orange, CT (US); Thomas M. Preston, Middlebury, CT (US); Eugene L. Parrella, Whitehouse Station, NJ (US); Desikan V. Srinivasan, Naugatuck, CT (US)

(73) Assignee: Transwitch Corporation, Shelton, CT (US)

(*) Notice: Subject to any disclaimer, the term of this patent is extended or adjusted under 35 U.S.C. 154(b) by 31 days.

(21) Appl. No.: 10/135,612

(22) Filed: Apr. 30, 2002

(65) Prior Publication Data

US 2003/0202516 A1 Oct. 30, 2003

(51) Int. Cl.[7] .............................................. G01R 31/08
(52) U.S. Cl. .................... 370/229; 370/395.1; 370/412; 370/432; 370/468
(58) Field of Search .......................... 370/236.1, 395.1, 370/235, 412, 468, 229, 432, 395.41

(56) References Cited

U.S. PATENT DOCUMENTS

| | | | |
|---|---|---|---|
| 4,660,169 A | 4/1987 | Norgren et al. ............. 364/900 |
| 5,526,344 A | 6/1996 | Diaz et al. .................... 370/16 |
| 5,572,686 A | 11/1996 | Nunziata et al. ............ 395/296 |
| 5,764,641 A | 6/1998 | Lin ............................. 370/412 |
| 5,893,162 A | 4/1999 | Lau et al. ................... 711/153 |
| 5,926,458 A | * 7/1999 | Yin ............................. 370/230 |
| 6,092,108 A | 7/2000 | DiPlacido et al. .......... 709/224 |
| 6,122,251 A | * 9/2000 | Shinohara ................... 370/231 |
| 6,122,252 A | 9/2000 | Aimoto et al. .............. 370/235 |
| 6,163,528 A | 12/2000 | Nagamoto .................. 370/236 |
| 6,246,682 B1 | * 6/2001 | Roy et al. ................... 370/390 |
| 6,307,858 B1 | * 10/2001 | Mizukoshi et al. ..... 370/395.71 |
| 6,438,134 B1 | * 8/2002 | Chow et al. ................ 370/412 |
| 6,445,705 B1 | * 9/2002 | Holden et al. .............. 370/394 |
| 6,519,225 B1 | * 2/2003 | Angle et al. ................ 370/229 |

* cited by examiner

*Primary Examiner*—Chau Nguyen
*Assistant Examiner*—Nittaya Juntima
(74) *Attorney, Agent, or Firm*—Gordon & Jacobson, P.C.

(57) ABSTRACT

An apparatus for avoiding head of line blocking in an ATM device includes a scheduler, at least one multicast queue, at least one unicast queue, a multicast session table, a multicast timer, and a problem PHY vector. The methods of the invention include alternate scheduling between multicast queue(s) and unicast queue(s). If a PHY device in a multicast session is inactive, it is skipped and the next PHY in the session is serviced. When the session has serviced all of the active PHYs and there remain only inactive PHYs in the session table, the session is ended. Preferably, a timer is started when only inactive PHYs remain in a session and the session is ended when the timer expires, if not sooner. Preferably, a problem PHY vector is maintained and updated at the end of each multicast session and when PHYs become active. The problem PHY vector includes a list of all of the presently inactive PHYs. The multicast session is preferably ended when the only PHYs remaining in the session are listed in the problem PHY vector.

39 Claims, 4 Drawing Sheets

METHOD AND APPARATUS FOR AVOIDING HEAD OF LINE BLOCKING IN AN ATM (ASYNCHRONOUS TRANSFER MODE) DEVICE

BACKGROUND OF THE INVENTION

1. Field of the Invention

The invention relates to Asynchronous Transfer Mode communications devices. More particularly, the invention relates to methods and apparatus for buffering ATM cells, particularly during multicasting.

2. State of the Art

ATM, by nature, is "bursty". Consequently, buffers must be provided in ATM devices so that cell loss is minimized. If one buffer is shared by more than one physical destination (PHY), an adverse effect known as "head of line blocking" can occur. Head of line blocking occurs when a cell at the head of a buffer cannot be transmitted to its PHY because of any number of reasons. This cell then blocks the transmission of all of the cells behind it. Head of line blocking can be avoided by providing separate buffers for each PHY in an ATM device. However, this can be costly and space consuming.

In an ATM network, it is often desirable to effect a multicast of ATM cells; i.e., to transport ATM cells from a source terminal to a plurality of different destinations. Each of the destinations of the multicast will typically have its own address. Thus, it is necessary to duplicate the ATM cells, provide different headers for each of the cells, and send the cells out on different virtual circuits (VCs). The different VCs may be located at different PHYs in the case of a spatial multicast or the same PHY in the case of a logical multicast. In the case of spatial multicast, extensive buffering may be necessary in order to accommodate all of the copies of each incoming multicast cell. It will be appreciated that the outgoing buffers will rapidly fill with copies of each single incoming multicast cell. In order to reduce the amount of buffer space required for multicasting, it is known to use a single buffer for multicast incoming cells and to replicate the cells just as they are ready to be transmitted out of the switch. Although this saves buffer space, it makes head of line blocking a more likely occurrence.

SUMMARY OF THE INVENTION

It is therefore an object of the invention to provide methods and apparatus for preventing head of line blocking in an ATM device.

It is also an object of the invention to provide methods and apparatus for preventing head of line blocking in an ATM device which do not require extensive use of buffer memory.

In accord with these objects which will be discussed in detail below, the apparatus of the present invention includes a UTOPIA interface, a scheduler, at least one multicast queue, at least one unicast queue, a multicast session table, a multicast timer, and a problem PHY vector. The methods of the invention include alternate scheduling between multicast queue(s) and unicast queue(s). In particular, the PHY devices are serviced in round robin or other fair scheduling order. According to first embodiment, which is not the presently preferred embodiment, as each PHY is serviced, it is determined whether there exists a unicast cell or a multicast cell or both for this PHY. If both unicast and multicast cells are scheduled for this PHY, scheduling is alternated between them. If only unicast or multicast cells are scheduled for this PHY, alternation is not necessary.

For purposes of this invention, the act of replicating a multicast cell to plural PHY destinations is referred to as a multicast "session" and the identities of the PHY destinations are stored in a multicast session table for each session. The copying of the cell to one of the PHYs in the multicast session is referred to as a "leaf" in the session. According to the first embodiment, a multicast timer is started when a multicast cell reaches the head of the multicast queue. The timer is a count down timer preferably based on the slowest PHY device. If a PHY device in a session is inactive, it is skipped and the next PHY in the session is serviced. The session ends when one of three events occurs: all PHYs in the session table have been serviced, the timer expires, or the only PHYs remaining in the session are PHYs listed in the problem PHY vector. At the end of each multicast session, the problem PHY vector is updated. The problem PHY vector includes a list of all of the PHYs which are deemed to be presently inactive based on the last multicast session and all previous multicast sessions. The problem PHY vector is updated whenever an inactive PHY becomes active, either in a unicast or a multicast cell transfer. The problem PHY vector is preferably used to shorten the multicast session before the timer expires. It may also be used by an external device to modify multicast session tables.

According to a second and presently preferred embodiment of the invention, the servicing of PHYs is driven by the status of the queues. In a background process, the status of the unicast and multicast queue is repeatedly updated. The status of PHYs is obtained through the UTOPIA interface. If the multicast queue is not empty and the last queue serviced was a unicast queue, the multicast queue is serviced by copying the head of line cell to the next active PHY in the multicast session (i.e. the next leaf of the session). If the multicast queue is empty or if the last cell serviced was not a unicast cell, the next (in round robin) available unicast queue is serviced. As used herein, "available unicast queue" means a queue with a cell ready to be sent to an active PHY which is not part of the current multicast session. During the multicast session, if the only PHYs remaining in the session table are PHYs which are in the problem PHY vector, the session is ended and the problem PHY vector is updated. If the only PHYs remaining in the multicast session include inactive PHYs which are not in the problem PHY vector, the multicast timer is started. The scheduler continues to attempt to complete the multicast session until the timer expires or until the only PHYs left are in the problem PHY vector. When the timer expires, the session is ended and the problem PHY vector is updated.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
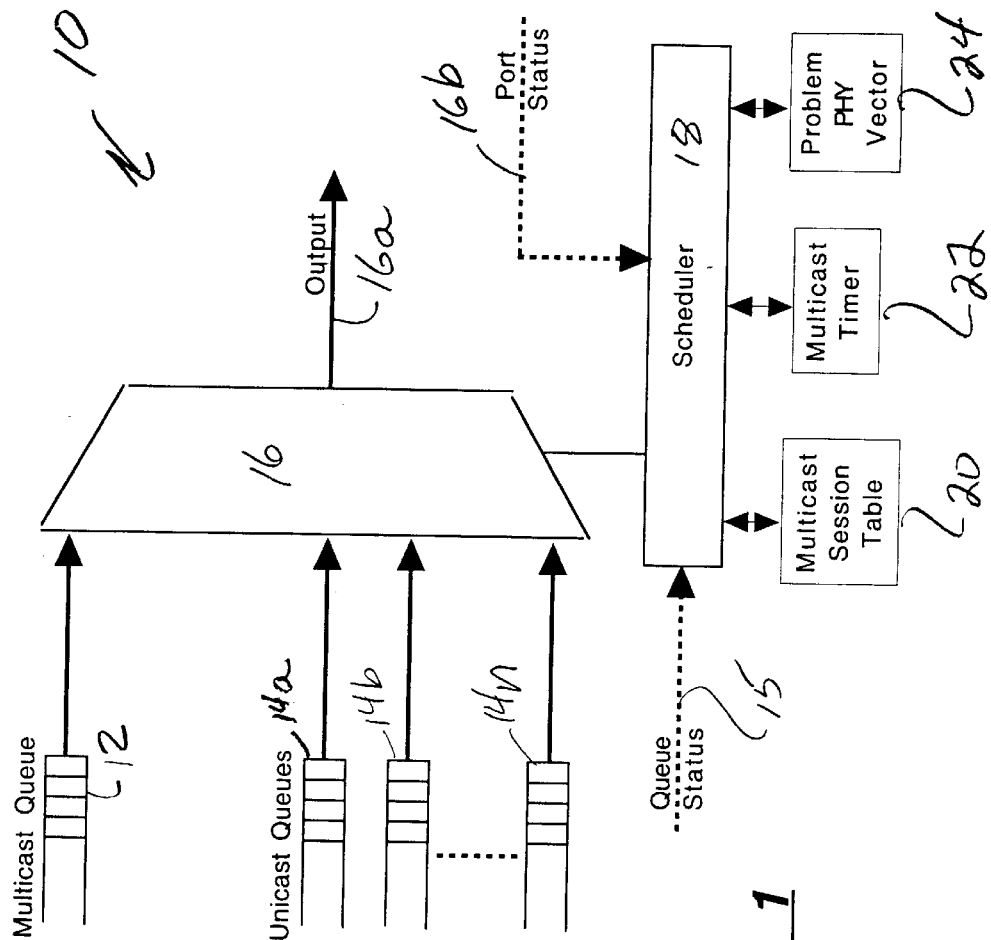
FIG. 1 is a high level schematic block diagram illustrating an apparatus according to the invention.

Referring now to FIG. 1, an ATM device 10 incorporating the invention includes one multicast queue 12 and a plurality of unicast queues 14a, 14b, ..., 14n which are implemented as FIFO buffers in RAM. The queues are multiplexed by multiplexer 16 onto a UTOPIA level 2 interface 16a, 16b to a plurality of PHY devices (also known as ports, not shown). According to the presently preferred embodiment, sixty-four unicast queues are supported, one for each destination PHY. A scheduler 18 is coupled to the multiplexer 16 and arbitrates transmission of cells from the queues onto the UTOPIA level 2 data path 16a based on port status received via UTOPIA level 2 polling results 16b and queue status 15 received from the queues 12, 14a, 14b, ..., 14n. The scheduler 18 is preferably implemented as a state machine. According to the a first, and not presently preferred, embodiment of the methods of the invention, the queues are serviced in a round robin fashion according to destination PHY. Unicast cells are sent from their queues to the output 16a if their destination port is available as indicated by the port status at 16b. If there exists both a 43 multicast cell and a unicast cell for a particular PHY, access to that PHY is alternated between the unicast flow and the multicast flow.

When servicing the multicast queue, the scheduler 18 utilizes a multicast session table 20, a multicast timer 22, and a problem PHY vector 24. The multicast session table is preferably implemented in RAM and includes two hundred fifty-six session entries. Each session entry is preferably a sixty-four bit string indicating which of the sixty-four ports are participating in the multicast session. A multicast session is defined as the process of copying a cell from the multicast queue to all of the PHYs (if possible) indicated by the corresponding multicast session table entry. Each cell in the multicast queue includes a pre-pended word indicating which multicast session table entry is to be used for copying the cell to multiple PHYs. The multicast timer 22 is a count down timer which is started each time a multicast cell reaches the head of the multicast queue 12. The duration of the timer 22 is preferably based on the data rate of the slowest destination PHY. The problem PHY vector is preferably a sixty-four bit string which indicates which PHYs are presently inactive.

Figure 2:
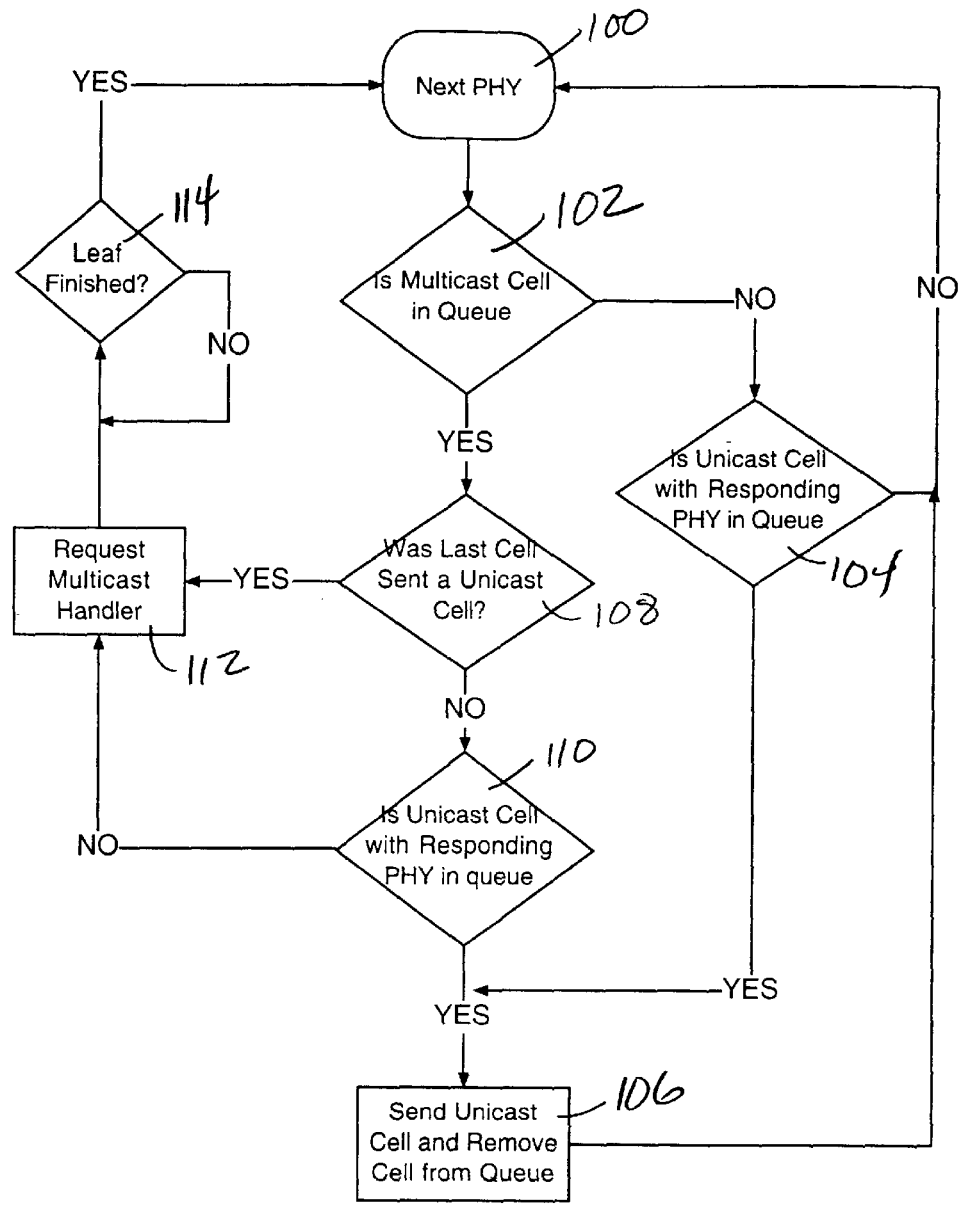
FIG. 2 is a high level simplified flow chart illustrating scheduling methods according to the first embodiment of the invention.
Figure 3:
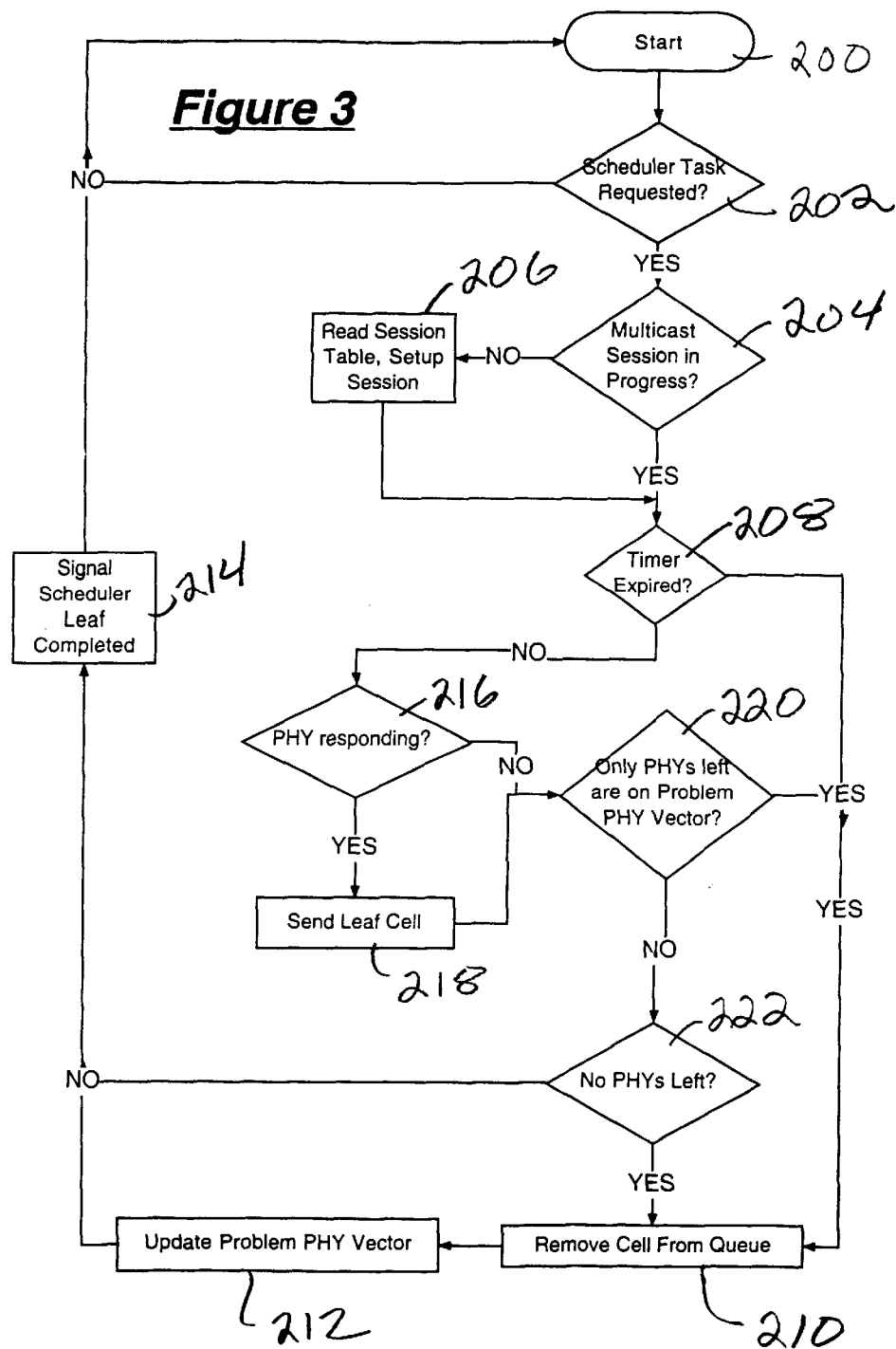
FIG. 3 is a high level simplified flow chart illustrating multicast session handler methods according to the first embodiment of the invention.

The methods of the first embodiment of the invention utilized by the scheduler 18 for servicing the multicast and unicast queues are illustrated by way of example in the flow charts of FIGS. 2 and 3.

Referring now to FIG. 2, for each PHY, starting at 100, the scheduler determines at 102 whether there is a multicast cell in the multicast queue which is scheduled for this PHY. This determination is made by determining whether the multicast queue is empty, and if it is not empty, looking up the entry in the multicast session table corresponding to the cell in the multicast queue. If there is not any multicast cell destined for this PHY, the scheduler determines at 104 whether there is a unicast cell in the unicast queue corresponding to this PHY and whether the PHY is responding. If it is determined at 104 that there is a unicast cell and the PHY is ready to receive, the scheduler causes the transmission of the unicast cell and removes it from the queue at 106, the proceeds to the next PHY at 100. If it is determined at 104 that there is no unicast cell in the queue or that the PHY is not ready to receive, the scheduler proceeds to the next PHY at 100.

If it is determined at 102 that a multicast cell is in the multicast queue and its session table entry includes this port, the scheduler determines at 108 whether the last cell sent to this port was a unicast cell. If it was not, the scheduler determines at 110 whether there is a unicast cell in the queue for this port and whether the port is ready to receive. If it is determined at 110 that there is a unicast cell ready to be sent, the scheduler sends the cell and removes it from the queue at 106, then proceeds to the next PHY at 100. If it is determined at 108 that the last cell sent to this PHY was a unicast cell, or if it is determined at 110 that no unicast cell is available to send, a multicast handler is called at 112. This is done even though the port may not be ready to receive a cell because the multicast handler needs to take note of which ports are inactive. The scheduler then waits at 114 until the multicast handler has completed its task for this port before proceeding to the next at 100.

FIG. 3 illustrates the operation of the multicast handler. After starting at 200, the multicast handler waits at 202 to be called upon by the scheduler described above with reference to FIG. 2. When it is determined at 202 that a multicast cell is ready to be sent, it is first determined at 204 whether a multicast session is already in progress. If this is the start of a new session, the session table is read and the session is set up at 206. Once a session is set up or is in progress, the multicast timer is checked at 208 to see if it has expired. When the timer is expired, the pending cell is removed from the multicast queue at 210, the problem PHY vector is updated at 212, and the scheduler is notified at 214 that the task is complete before returning to 200 to wait to be called again by the scheduler.

If it is determined at 208 that the timer has not expired, it is then determined at 216 whether the PHY to which the multicast cell is to be copied is ready to receive. If it is, the cell is copied to the PHY at 218. After the cell is sent, or if it is determined at 216 that the PHY is not responding (is not able to receive a cell), it is then determined whether the session should be ended. In particular, it is determined at 220 whether the only PHYs remaining in the session are in the problem PHY vector. If that is the case, the session is ended by removing the cell from the queue at 210, updating the problem PHY vector at 212, and returning control to the scheduler at 214. The session is also terminated if it is determined at 222 that all of the PHYs in the session have been serviced.

According to the invention, the problem PHY vector can be used by an external device to alter the multicast session tables and/or to change the duration of the multicast session timer.

One of the advantages of the problem PHY vector is that a problem PHY causes a time-out only once. Thereafter, it is listed in the problem PHY vector and will be treated as if it were not listed in the session table entry.

Figure 4:
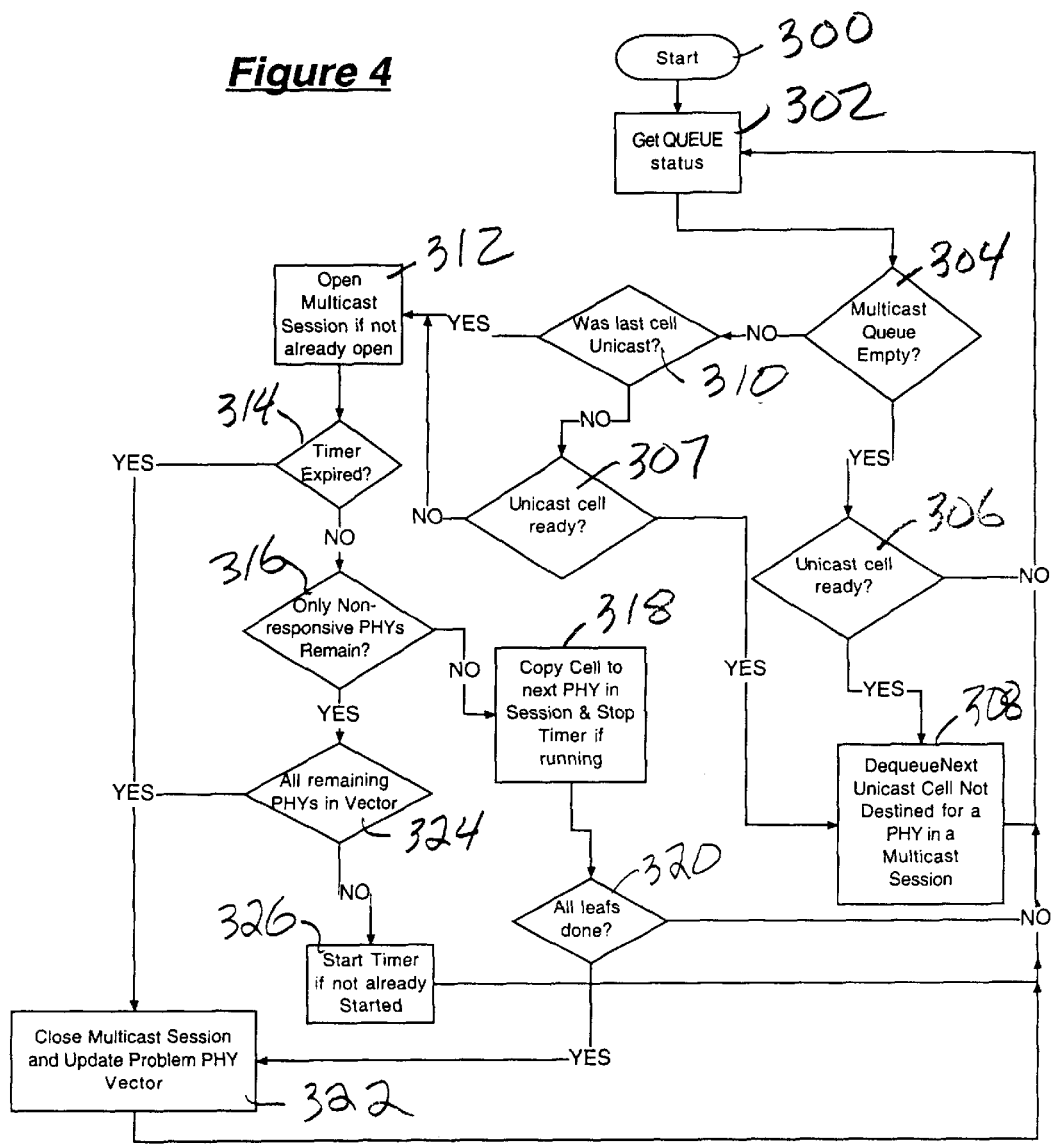
FIG. 4 is a high level simplified flow chart illustrating the presently preferred methods of the invention.

Turning now to FIG. 4, the presently preferred methods of the invention schedule cells based primarily on queue status and secondarily on PHY status. Starting at 300, queue status is obtained at 302 and it is determined at 304 whether the multicast queue is empty. If there is no cell at the head of the multicast queue, it is determined at 306 whether there is a unicast cell ready to be sent. The determination at 306 includes determining which unicast queues have cells to be sent, which PHYs are active, and which unicast queue was last serviced. If it is determined that there are unicast cells ready to be sent, the appropriate cell is dequeued at 308. According to the presently preferred embodiment, the cell dequeued at 308 is the cell from the next unicast queue (in round robin) which has a cell ready to be sent to an active PHY which is not a PHY in a pending multicast session. If there is no unicast cell ready as determined at 306, the scheduler returns to 302. If a unicast cell is ready as determined at 306, the cell is sent at 308 and the scheduler returns to 302 and processes the next queue.

If it is determined at 304 that the multicast queue is not empty, it is then determined at 310 whether the last cell sent was a unicast cell. According to the preferred embodiment of the invention, when the multicast queue is not empty, unicast cells are multiplexed 1:1 with multicast cells by the scheduler. Thus, if the last cell was not a unicast cell, it is determined whether a unicast cell is ready to be sent at 307. If it is ready, the unicast queue is serviced at 308 before the multicast queue is serviced. If the last cell sent was a unicast cell as determined at 310, or if no unicast cells are ready as determined at 307, a multicast session table is opened at 312, if one is not already in progress. Although the multicast timer may not yet have been set, for simplicity, FIG. 4 shows the timer being checked at 314. If the timer is not expired, it is determined at 316 whether all of the PHYs remaining in the session are inactive. If there are active PHYs remaining in the session, the multicast cell is copied at 318 to the next active PHY in the session and, if the timer had been running, it is stopped, but not reset. At 320, it is determined whether all of the leafs in the multicast session have been serviced. If they have, the session is closed and the problem PHY vector is updated at 322 before the process returns to 302. If leafs remain in the session as determined at 320, the session is not closed and the process returns to 302.

If, during a multicast session, it is determined at 316 that the only PHYs remaining in the session are inactive, it is then determined at 324 whether all of these inactive PHYs are listed in the problem PHY vector. If all of the remaining inactive PHYs are listed in the problem PHY vector, the session is ended at 322. If at least one of the inactive PHYs remaining in the session is not listed in the problem PHY vector, the multicast timer is started at 326, if it is not already running and the process returns to 302. As mentioned above, if, during a multicast session, the multicast timer expires as determined at 314, the session is ended and the problem PHY vector is updated to include the inactive PHY(s) which remained on the session table when the timer expired.

According to the presently preferred embodiment, during a multicast session, ports in the session table are "checked off" when they are serviced in order to make the determinations at 316 and 324. Though not shown in FIG. 4, the problem PHY vector is also updated whenever a PHY in the vector displays a UTOPIA CLAV signal.

There have been described and illustrated herein several embodiments of a methods and apparatus for avoiding head of line blocking in an ATM device. While particular embodiments of the invention have been described, it is not intended that the invention be limited thereto, as it is intended that the invention be as broad in scope as the art will allow and that the specification be read likewise. Thus, while particular method steps have been disclosed in particular order, it will be appreciated that some variation in the order of the steps will produce substantially the same results. It will be appreciated that, depending on the hardware implementation, some steps may be performed simultaneously. Also, while a specific number of queues and table entries have been shown, it will be recognized that other numbers of queues and table entries could be used with similar results obtained. It will therefore be appreciated by those skilled in the art that yet other modifications could be made to the provided invention without deviating from its spirit and scope as so claimed.

What is claimed is:

1. An apparatus for avoiding head of line blocking in an ATM device, comprising:
   a) a multiplexer;
   b) at least one unicast queue coupled to said multiplexer;
   c) at least one multicast queue coupled to said multiplexer;
   d) a scheduler coupled to said multiplexer; and
   e) a multicast session table accessible by said scheduler, said multicast session table including a list of physical layer devices to which a multicast cell is to be copied, wherein
       said scheduler alternates between unicast and multicast queues for cell transmission and inactive physical layer devices in a multicast session are ignored.

2. An apparatus according to claim 1, wherein:
   a multicast session is closed and its associated cell removed from the multicast queue when all of the physical layer devices in the session have been serviced and,
   a multicast session is closed and its associated cell removed from the multicast queue when all of the physical layer devices remaining in the session are inactive.

3. An apparatus according to claim 1, further comprising:
   f) a multicast timer coupled to said scheduler, wherein
       said timer is started when a cell reaches the head of the multicast queue and the multicast session is closed when said timer expires or all of the physical layer devices in the session have been serviced.

4. An apparatus according to claim 1, further comprising:
   f) a multicast timer coupled to said scheduler, wherein
       said timer is started when the only physical layer devices remaining in the multicast session are inactive and the multicast session is closed when said timer expires or all of the physical layer devices in the session have been serviced whichever occurs first.

5. An apparatus according to claim 1, further comprising:
   f) a problem physical layer vector coupled to said scheduler, wherein
       said problem physical layer vector contains a list of inactive physical layer devices and is updated at the end of each multicast session.

6. An apparatus according to claim 5, wherein:
   said problem physical layer vector is updated whenever an inactive physical layer becomes active.

7. An apparatus according to claim 5, wherein:
   the multicast session is closed when all of the physical layer devices remaining to be serviced are listed in the problem physical layer vector.

8. An apparatus according to claim 3, further comprising:
   g) a problem physical layer vector coupled to said scheduler, wherein
       said problem physical layer vector contains a list of inactive physical layer devices and is updated at the end of each multicast session.

9. An apparatus according to claim 8, wherein:
   said problem physical layer vector is updated whenever an inactive physical layer becomes active.

10. An apparatus according to claim 8, wherein:
    the multicast session is closed when all of the physical layer devices remaining to be serviced are listed in the problem physical layer vector.

11. An apparatus according to claim 4, further comprising:
    g) a problem physical layer vector coupled to said scheduler, wherein
        said problem physical layer vector contains a list of inactive physical layer devices and is updated at the end of each multicast session.

12. An apparatus according to claim 11, wherein:
    said problem physical layer vector is updated whenever an inactive physical layer device becomes active.

13. An apparatus according to claim 11, wherein:
the multicast session is closed when all of the physical layer devices remaining to be serviced are listed in the problem physical layer vector.

14. A method for avoiding head of line blocking in an ATM device, comprising:
servicing destination ports according to an arbitration scheme;
said servicing including alternating between unicast and multicast queues for cell transmission to the same port only when both a unicast cell and a multicast cell are scheduled for the same port and ignoring inactive physical layer devices in a multicast session;
starting a timer when a multicast cell becomes the head of the multicast queue; and
closing the multicast session when the timer expires.

15. A method according to claim 14, further comprising:
closing a multicast session and removing its associated cell from the multicast queue when all of the physical layer devices in the session have been serviced or all of the physical layer devices remaining in the session are inactive.

16. A method according to claim 14, further comprising:
closing the multicast session when all of the physical layer devices in the session have been serviced.

17. A method according to claim 14, further comprising:
maintaining a problem physical layer vector which contains a list of inactive physical layer devices and is updated at the end of each multicast session.

18. A method according to claim 17, further comprising:
closing the multicast session when all of the physical layer devices remaining in the session are listed in the problem physical layer vector.

19. A method according to claim 18, further comprising:
updating the problem physical layer vector whenever an inactive physical layer device becomes active.

20. A method according to claim 16, further comprising:
maintaining a problem physical layer vector which contains a list of inactive physical layer devices and is updated at the end of each multicast session.

21. A method according to claim 20, further comprising:
closing the multicast session when all of the physical layer devices remaining in the session are listed in the problem physical layer vector.

22. A method according to claim 21, further comprising:
updating the problem physical layer vector whenever an inactive physical layer device becomes active.

23. A method for avoiding head of line blocking in an ATM device, comprising:
servicing unicast and multicast queues according to an arbitration scheme;
said servicing including alternating between unicast and multicast queues for cell transmission and ignoring inactive physical layer devices in a multicast session;
starting a timer when the only physical layer devices remaining in a multicast session are inactive: and
closing the multicast session when the timer expires.

24. A method according to claim 23, further comprising:
closing a multicast session and removing its associated cell from the multicast queue when all of the physical layer devices in the session have been serviced.

25. A method according to claim 23, further comprising:
closing the multicast session when all of the physical layer devices in the session have been serviced.

26. A method according to claim 23, further comprising:
maintaining a problem physical layer vector which contains a list of inactive physical layer devices and is updated at the end of each multicast session.

27. A method according to claim 26, further comprising:
closing the multicast session when all of the physical layer devices remaining in the session are listed in the problem physical layer vector.

28. A method according to claim 27, further comprising:
updating the problem physical layer vector whenever an inactive physical layer device becomes active.

29. A method according to claim 25, further comprising:
maintaining a problem physical layer vector which contains a list of inactive physical layer devices and is updated at the end of each multicast session.

30. A method according to claim 29, further comprising:
closing the multicast session when all of the physical layer devices remaining in the session are listed in the problem physical layer vector.

31. A method according to claim 30, further comprising:
updating the problem physical layer vector whenever an inactive physical layer device becomes active.

32. An apparatus for avoiding head of line blocking in an ATM device, comprising:
a) a multiplexer;
b) at least one unicast queue coupled to said multiplexer;
c) at least one multicast queue coupled to said multiplexer;
d) a scheduler coupled to said multiplexer;
e) a multicast session table accessible by said scheduler, said multicast session table including a list of physical layer devices to which a multicast cell is to be copied; and
f) a problem physical layer vector which includes an indication of physical layer devices which are not responding, wherein
a multicast session is closed and its associated cell removed from the multicast queue when the only physical layer devices remaining to be serviced are indicated in the problem physical layer vector.

33. An apparatus according to claim 32, wherein:
a multicast session is closed and its associated cell removed from the multicast queue when all of the physical layer devices in the session have been serviced or all of the physical layer devices remaining in the session are inactive.

34. An apparatus according to claim 32, further comprising:
g) a multicast timer coupled to said scheduler, wherein said timer is started when the only physical layer devices remaining in the multicast session are inactive physical layer devices and at least one of the remaining physical layer devices is not indicated in the problem physical layer vector and the multicast session is closed when said timer expires or all of the physical layer devices in the session have been serviced.

35. An apparatus according to claim 32, wherein:
said problem physical layer vector is updated whenever an inactive physical layer device becomes active.

36. A method for avoiding head of line blocking in an ATM device, comprising:
a) servicing multicast and unicast queues according to an arbitration scheme;

b) servicing multicast destinations (physical layer devices) according to an entry in a multicast session table;

c) maintaining a problem physical layer vector which indicates the physical layer devices which are not responding;

d) terminating a multicast session when the only destinations remaining to be serviced are indicated in the problem physical layer vector.

37. A method according to claim 36, further comprising:

e) closing a multicast session and removing its associated cell from the multicast queue when all of the physical layer devices in the session have been serviced or all of the physical layer devices remaining in the session are inactive.

38. A method according to claim 36, further comprising:

e) starting a timer when the only physical layer devices remaining in a multicast session are inactive and at least one of the physical layer devices is not indicated in the problem physical layer vector; and f) closing the multicast session when the timer expires or all of the physical layer devices in the session have been serviced.

39. A method according to claim 36, further comprising:

e) updating the problem physical layer vector whenever an inactive physical layer becomes active.

* * * * *